U S008973896B2

(12) United States Patent
Tiberghien et al.

(10) Patent No.: US 8,973,896 B2
(45) Date of Patent: Mar. 10, 2015

(54) DISCHARGE AND PURGING DEVICE, A CONNECTING ENDPIECE AND CONNECTOR COMPRISING SUCH A DEVICE

(71) Applicant: Staubli Faverges, Faverges (FR)

(72) Inventors: Alain-Christophe Tiberghien, Sevrier (FR); Christophe Durieux, Gilly sur Isere (FR); Romain Mayer, Ugine (FR)

(73) Assignee: Staubli Faverges, Faverges (FR)

( * ) Notice: Subject to any disclaimer, the term of this patent is extended or adjusted under 35 U.S.C. 154(b) by 128 days.

(21) Appl. No.: 13/903,338

(22) Filed: May 28, 2013

(65) Prior Publication Data

US 2013/0319558 A1  Dec. 5, 2013

(30) Foreign Application Priority Data

May 29, 2012 (FR) ...................................... 12 54934

(51) Int. Cl.
| F16L 37/28 | (2006.01) |
| F16L 37/32 | (2006.01) |
| F16K 5/10 | (2006.01) |
| F16K 17/00 | (2006.01) |
| F16K 39/02 | (2006.01) |

(52) U.S. Cl.
CPC ............... *F16K 17/00* (2013.01); *F16K 39/024* (2013.01); *F16L 37/32* (2013.01)
USPC .............. 251/149.6; 137/614.03; 137/614.04; 137/614.17

(58) Field of Classification Search
CPC ......... F16L 37/35; F16L 37/32; F16K 39/024
USPC .................. 137/614, 614.03, 614.04, 614.05, 137/614.16, 614.17, 614.18; 251/149.1, 251/149.6
See application file for complete search history.

(56) References Cited

U.S. PATENT DOCUMENTS

| 3,550,624 A | * | 12/1970 | Johnson ......................... 137/614 |
| 4,703,774 A | * | 11/1987 | Seehausen ............... 137/614.04 |
| 5,107,890 A | | 4/1992 | Gute |

(Continued)

FOREIGN PATENT DOCUMENTS

WO  82/01929 A1  6/1982

*Primary Examiner* — Kevin Lee
*Assistant Examiner* — Michael R Reid
(74) *Attorney, Agent, or Firm* — Dowell & Dowell, PC

(57) ABSTRACT

The invention relates to a discharge and purging device (10) adapted for limiting the pressure of a fluid (F) occupying the inner volume of a connecting endpiece (2). The device (10) comprises a valve or a valve actuation piston; an inner enclosure (30) opening out on a front face (22) of the valve or of the piston; and an obturator (60) moveable between a closed position (C1) where it obturates the front face (22) at a first seal area (Z92) defining a first seal section (S92) towards the front face (22) and an open position where it no longer obturates the front face (22). The device (10) also comprises a first chamber (50) defined when the obturator (60) is in a closed position, between the enclosure (30), the obturator (60), the first seal area (Z92) and a second seal area (Z94) defining a second seal section (S94) opposite to the front face (22) relatively to the first seal area (Z92); a communication passage (36) between the first chamber (50) and the inner volume of the endpiece (2); means (96) for returning the obturator into the closed position; and a second chamber (40) defined between the enclosure (30), the second seal area (Z94) and the obturator (60), and isolated from the inner volume of the endpiece (2) and from the first chamber (50). The first seal section (S92) is smaller than the second seal section (S94).

14 Claims, 8 Drawing Sheets

(56) References Cited

U.S. PATENT DOCUMENTS 5,482,083 A * 1/1996 Jenski ............... 137/614.03
5,669,426 A * 9/1997 Fontaine, Jr. ............ 137/614.17
2006/0151032 A1* 7/2006 Giagnoli et al. ......... 137/614.04
2010/0108162 A1* 5/2010 Nishio et al. ............ 137/614.03

* cited by examiner

DISCHARGE AND PURGING DEVICE, A CONNECTING ENDPIECE AND CONNECTOR COMPRISING SUCH A DEVICE

The present invention relates to a discharge and purging device comprising a valve or a valve actuation piston, adapted for limiting the circulation of a fluid occupying the inner volume of a connecting endpiece connected to a duct and with which it is possible to lower the residual pressure of this fluid upon coupling. The invention also relates to a connecting endpiece comprising such a device. The invention also relates to a connector comprising a male connecting endpiece, a female connecting endpiece and at least one such device. The field of the invention is those of connectors for the removable junction of ducts in which pressurized gas and/or liquid fluids circulate.

A connector comprises two connecting endpieces, male and female endpieces respectively, which each comprise a fluid vein and may be connected to each other in order to form a fluid transport circuit. A mobile valve is generally positioned at the connecting interface between both endpieces, in order to limit or allow circulation of the fluid from one to the other by opening and closing the fluid circuit. When the valve is maintained in a leak-proof contact against a sealing element of the connector, notably under the action of a spring and/or by pressure of the fluid, the circuit is closed. When the valve is moved away from the sealing element, the circuit is open.

Valves integrating purging systems are known, provided for assisting an operator in overcoming the coupling forces in the connector, related to the residual pressure on the connector sections. A piston is placed in an inner enclosure of the valve opening onto its front face and maintains the circuit closed in a sealed way, as long as this piston is not pushed back in the enclosure under the action of a member outside the valve. This piston allows balancing of the pressure of the circuit relatively to ambient pressure, thereby facilitating coupling of the male and female endpieces.

Moreover valves integrating automatic discharging systems are known, such as valves ensuring a limiting function, for example a ball-valve in U.S. Pat. No. 5,107,890. The valve gives the possibility of discharging small amounts of fluid when the environment of the connector causes an increase in the pressure of the fluid in the circuit, because of an increase in the outside temperature or pressure, or of the mechanical compression of a fluid volume. The valve constantly and automatically guarantees that the pressure of the fluid does not exceed a predetermined level, which would risk damaging the connector and degrading its operation.

Further, in the case of particular applications such as the cooling of a set of electronic components by a cooling plate, the connection of variable pressurized circuits is distinguished by the complexity of its constraints. Distinct systems partly give the possibility of meeting the problems of circuit purging and of limiting the rise in pressure, but none of them have entirely solved the problems of manual coupling of a pressurized circuit, or of ejection of the gaskets upon opening the valves, of uncertainty on the exact opening conditions of the circuit, of the congestion of the connecting systems, or even of damaging the connector as a result of the pressure rise in the circuit.

The object of the present invention is to propose a discharge and purging device and improved connecting means.

For this purpose, the object of the invention is a discharge and purging device, adapted for limiting the pressure of a fluid occupying the inner volume of a connecting endpiece connected to a duct and allowing lowering the residual pressure of this fluid upon coupling, the device comprising:
- a valve or a valve actuation piston,
- an inner enclosure opening out on a front face of the valve or of the valve actuation piston, this front face being intended for cooperating with a valve actuation piston or a valve of an additional connecting endpiece, and
- an obturator moveable in translation in the enclosure along a central axis between:
  - a closed position wherein the obturator obturates the front face of the enclosure at a first seal area defining a first seal section located on the side of the front face and
  - an open position wherein the obturator no longer obturates the front face.

According to the invention, the device also comprises:
- a first chamber defined when the obturator is in its closed position, between walls of the enclosure, the obturator, the first seal area and a second seal area defining a second seal section located opposite the front face relatively to the first seal area,
- a communication passage between this first chamber and the inner volume of the connecting endpiece,
- means for returning the obturator to its closed position, and
- a second chamber defined between walls of the enclosure, the second sealing area and the obturator, this second chamber being isolated from the inner volume of the connecting endpiece and from the first chamber,
- and the first seal section is smaller than the second seal section.

Thus the invention allows both automatic limitation of the pressure rise in the fluid circuit and voluntary balancing of the pressure of the fluid in the connector during the connection between the endpieces. The discharge and purging device according to the invention is compact, reliable, practical and its operating conditions are well under control. The valve or the piston for actuating a dual function valve allows the filling and emptying of a fluid circuit, notably of a circuit of a liquid for cooling a mold, plate, or any other device, while improving the maneuvering and safety of the installation.

According to other advantageous characteristics of the invention, taken individually or as a combination:
- the obturator comprises at least one channel opening out from the front portion of the obturator and extending through the obturator between the second chamber and the outside of the obturator,
- the obturator includes two channels opening out from the front portion of the obturator radially to the central axis and extending between the second chamber and the outside of the obturator.
- the first seal area includes sealing means which are fixed relatively to the valve or to the piston for actuating a valve when the obturator is moveable in the enclosure.
- a frusto-conical surface of the obturator is maintained in leak-proof contact against the sealing rings in the closed position of the obturator,
- the sealing means are fixed by adhesion to the valve or to the piston for actuating a valve,
- a cylindrical external surface of the obturator is maintained in leak-proof contact radially to the central axis against the sealing means in the closed position of the obturator.
- the sealing means are positioned in a radial groove centered on the central axis.
- the sealing means comprise an O-ring gasket,
- the device comprises a cap screwed into a tapped portion of the enclosure at the front face.
- the first seal area includes sealing means secured to the cap.

the means for returning the obturator, positioned in the second chamber, comprise a single spring having a first end bearing against the obturator and a second end bearing against a wall of the enclosure.

The object of the invention is also a connecting endpiece suitable for the circulation of pressurized fluids, this connecting endpiece being configured like a male or female endpiece and adapted for coupling with another mating either male or female connecting endpiece. The connecting endpiece is equipped with a discharge and purging device as mentioned above.

The object of the invention is also a connector adapted for the circulation of pressurized fluids, comprising a female connecting endpiece connected to a first duct and a male connecting endpiece connected to a second duct. At least one connecting endpiece from the female connecting endpiece and the male connecting endpiece is equipped with a discharge and purging device as mentioned above.

The invention will be better understood upon reading the description which follows, only given as a non-limiting example and made with reference to the appended drawings wherein:

FIG. 1 is an axial sectional view of a connector according to the invention, in the uncoupled configuration, this connector comprising a connecting endpiece according to the invention, provided with a discharge and purging device of the valve type according to the invention, this connecting endpiece being configured like a female endpiece and adapted for receiving a male endpiece provided with a piston for actuating the valve;

Figure 1:
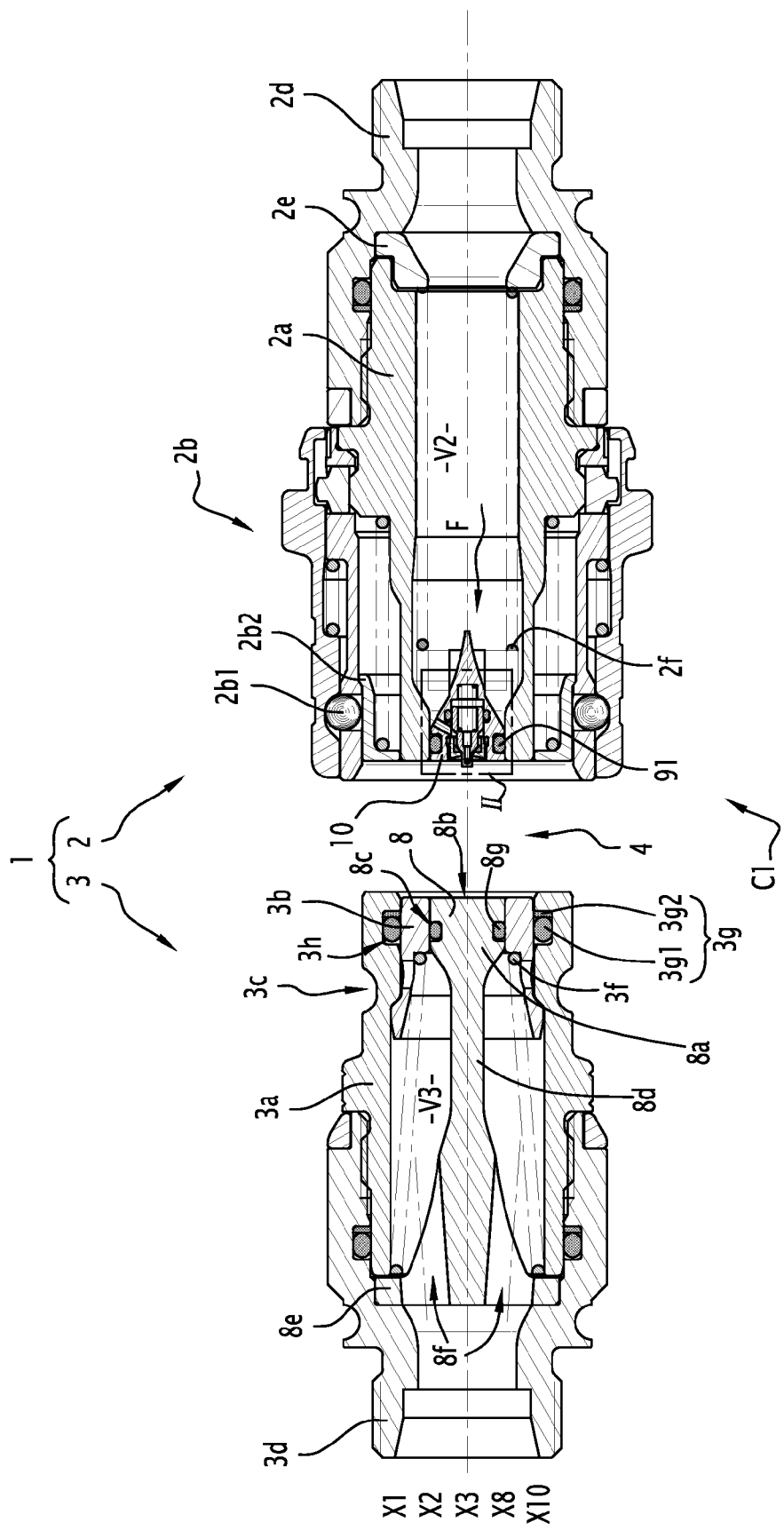
Figure 6:
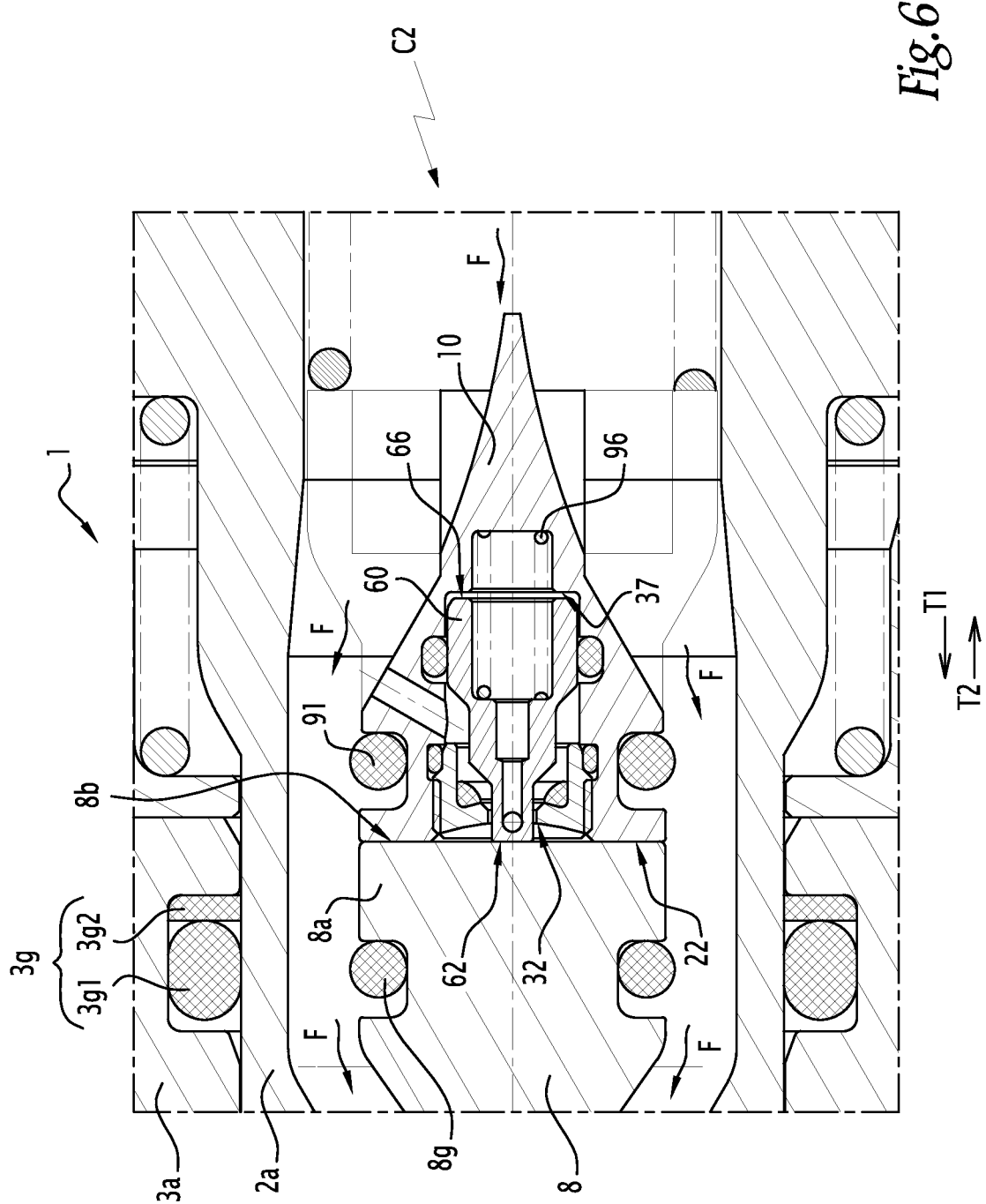
FIG. 6 is a larger-scale view of the detail VI in FIG. 5, showing the valve with the obturator in the open position.
Figure 9:
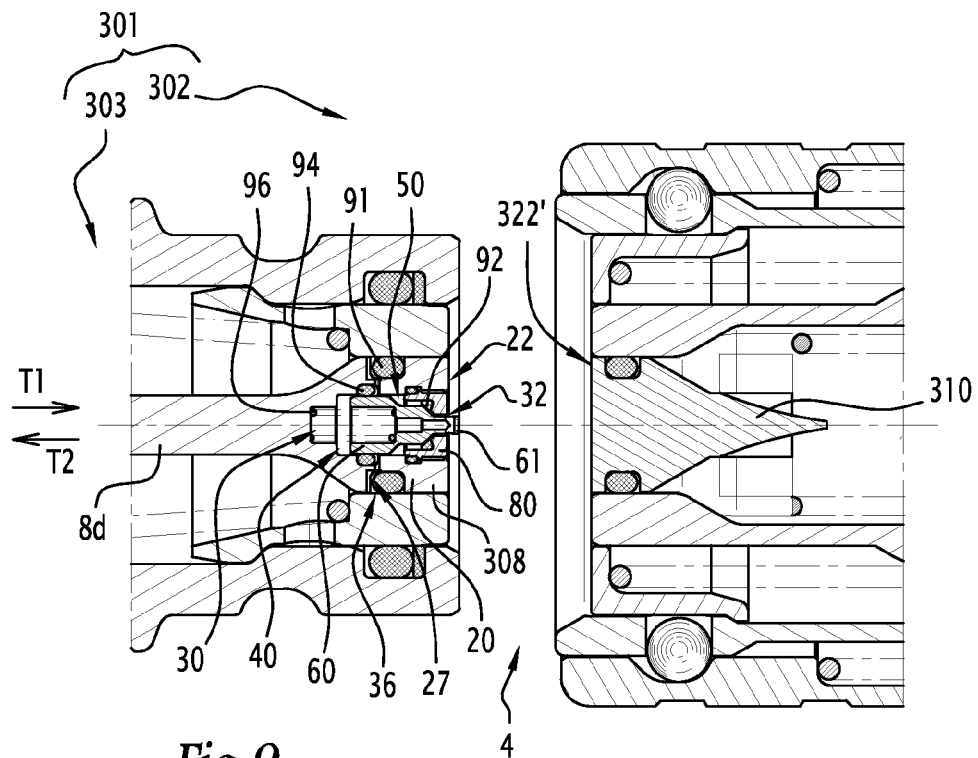
Figure 10:
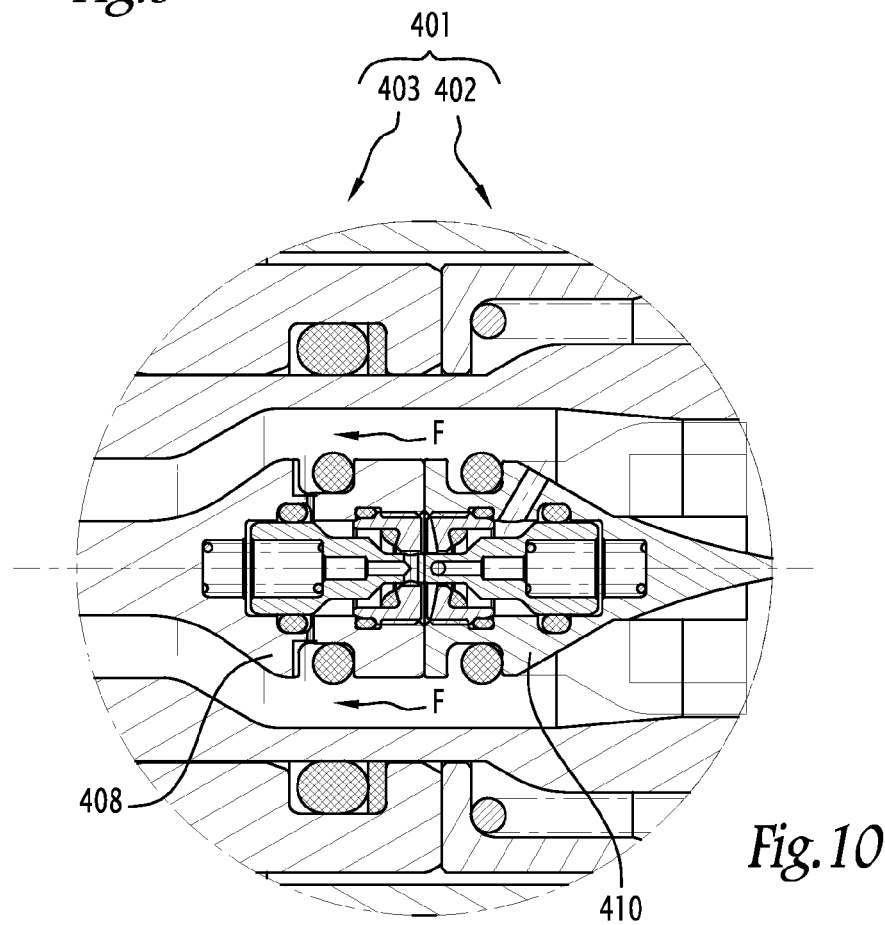

FIG. 9 is a partial view similar to FIG. 1, at a slightly larger scale, of a fourth embodiment of a connector, of a connecting endpiece and of a discharge and purging device according to the invention, the device being of the valve actuation piston type and fitting out the male endpiece instead of the female endpiece of the connector; and FIG. 10 is a view similar to FIG. 6, at a slightly smaller scale, of a fifth embodiment of a connector according to the invention, the female endpiece and the male endpiece each being equipped with a device of the valve type or of the valve actuation piston type according to the invention.

In FIGS. 1 to 6, a connector 1 is illustrated according to the invention.

This connector 1 is formed by a female connecting endpiece 2, also according to the invention, and by a male connecting endpiece 3. The female endpiece 2 is equipped with a valve 10 forming a discharge and purging device also according to the invention. Subsequently for each of the endpieces 2 and 3, a front side 4 corresponding to the interface area or connecting area is defined.

As shown in FIG. 1, the female endpiece 2 comprises a main body 2a centered on a longitudinal axis X2, a locking mechanism 2b notably including balls 2bg1 and a ring 2b2, a rear portion 2d adapted so as to be connected to a duct, a rear supporting member 2e fixedly interposed between the body 2a and the portion 2d along the axis X2, as well as a spring 2f positioned in the rear, bearing against the member 2e and in the front, bearing against the valve device 10 in the body 2a. The endpiece 2 includes an inner volume V2 which is delimited in the body 2a, the portion 2d and the member 2e. In this inner volume V2 are accommodated the spring 2f and the valve device 10. This inner volume V2 is provided for the sealing of the fluid F when the portion 2d is connected to the duct. The valve device 10 is moveable in the inner volume V2 along a valve axis X10 coinciding with the axis X2.

The male endpiece 3 comprises a main body 3a centered on a longitudinal axis X3, a drawer 3b positioned in the body 3a of the front side 4, a piston 8 partly laid out in the drawer 3b, an annular external groove 3c made in the body 3a and provided for cooperating with the mechanism 2b, a rear portion 3d adapted in order to be connected to a duct, a spring 3f positioned in the rear, bearing against a rear base 8e of the piston 8 and in the front, bearing against the drawer 3b, as well as sealing means 3g made in an annular internal groove 3h made in the body 3a. The sealing means 3g more specifically comprise an annular gasket 3g1 and an anti-extrusion ring 3g2, which surround the drawer 3b in the uncoupled configuration of FIG. 1. The anti-extrusion ring 3g2 mainly allows limitation of the ejection of the gasket 3g1 in a coupled configuration, while the ejection of the gasket 3g1 in the uncoupled configuration is limited by the device according to the invention.

The piston 8 extends along a longitudinal axis X8 and is attached in the endpiece 3.

The piston 8 comprises a front head 8a provided with a front supporting face 8b, an external annular groove 8c receiving an annular sealed gasket 8g, a central rod 8d, a rear base 8e fixedly interposed between the body 3a and the rear portion 3d, as well as four conduits 8f distributed around the axis X8 and crossing the rear base 8e. When the connector 1 is an uncoupled configuration, as shown in FIG. 1, the gasket 8g provides the seal between the head 8a and the drawer 3b. The endpiece 3 includes an inner volume V3 which is delimited in the body 3a, the portion 3d and the conduits 8f. In this inner volume V3 are accommodated the spring 3f, the drawer 3d, the rod 8d and the head 8a of the piston 8. This inner volume V3 is provided for receiving the fluid F when the endpiece 3 is attached to the endpiece 2, in a coupled configuration of the connector 1 detailed hereafter with reference to FIG. 5.

Figure 5:
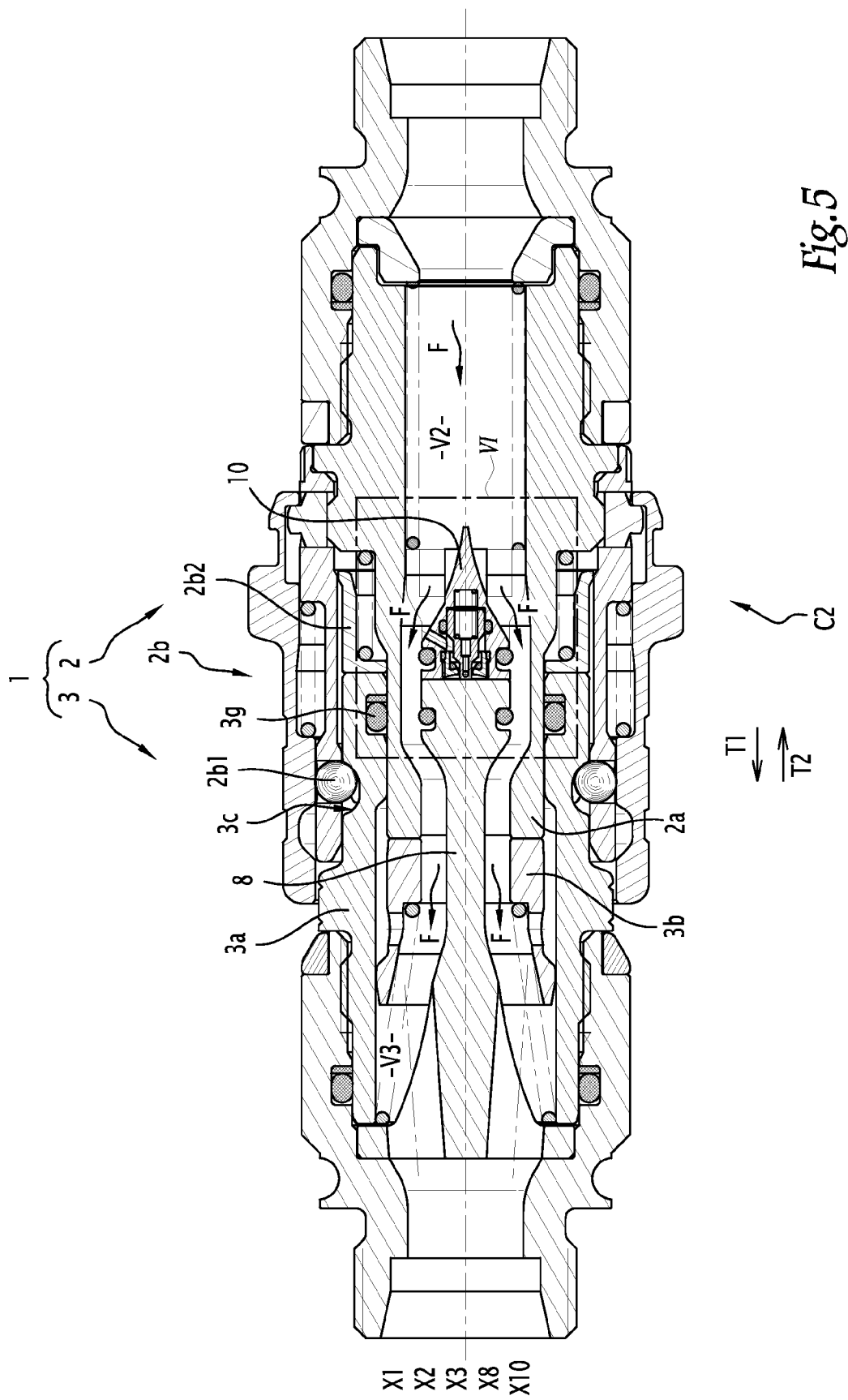
FIG. 5 is a view at another scale, showing the connector in a coupled configuration, with the obturator in the open position.

As shown in FIGS. 1 and 5, the endpieces 2 and 3 may be coupled and locked in a coupled configuration by cooperation of the mechanism 2b of the endpiece 2, notably of the balls 2b1, with the groove 3c of the endpiece 2. Alternatively, the endpieces 2 and 3 may be configured so as to be coupled by screwing or by any coupling system suitable for the present application. When the endpieces 2 and 3 are coupled, in other words, when the connector 1 is in the coupled configuration, the axes X2, X3, X8 and X10 coincide with a longitudinal axis X1 of the connector 1, as shown in FIG. 5.

As an example, the fluid F covering the fluid circuit, in particular the inner volumes V2 and V3, may be a liquid coolant. This fluid may cover the installation and cooling plates equipped with the connector 1. The temperature of this liquid may be of the order of 10° C. at the inlet of the circuit and of the order of 50° C. at the outlet. In practice, the operator should be able to disconnect the plates and tubes of the system for supplying and collecting the liquid transported in the installation. At the end of the circulation circuits for the fluids internal to the plate, a connecting endpiece comprises a valve which then maintains the circuit closed.

When an installation which is not equipped with devices 10 according to the invention, is disconnected, several problems may be posed. Pressure increases in the circuit, generally because of the increase in the temperature of the installation, which causes a risk of overpressure which may damage the installation. The conditions for a pressure rise in the circuit may prevent the operator from reconnecting the pipe to the inlet and outlet circuits, with a coupling force greater than the accumulated forces of the spring 2*f* and of the pressure of the circuit on the valve, because of a too large residual pressure. The seal gaskets fitting out the valve may be ejected under the effect of the sudden opening of the circuit, during the coupling between the male and female connecting endpieces. Moreover, the pressure plateaus beyond which the circuit has to open for safety reasons, or because an operator desires opening of the circuit for coupling the connector, are also generally poorly under control. Further it is sought to integrate the functions of limiter and purger in a compact and reliable system.

The device 10 according to the invention of the valve type in FIGS. 1 to 6, gives the possibility of solving the aforementioned problems.

According to the invention, the valve device 10 ensures a dual function of limiter and purger. The valve device 10 is translationally moveable in the female connecting endpiece 2, more specifically in the inner volume V2 crossed by the fluid F2 in a translational direction T1 directed forwards 4 or in a translational direction T2 directed rearwards. The valve device 10 comprises rear tabs 16, against which bears the spring 2*f*. The spring 2*f* tends to push back the valve device 10 in translation T1 towards the front 4, so that a front supporting surface 18 of the tab 16 will abut against the body 2*a* of the endpiece 2, as shown in FIGS. 1 to 4.

Figure 2:
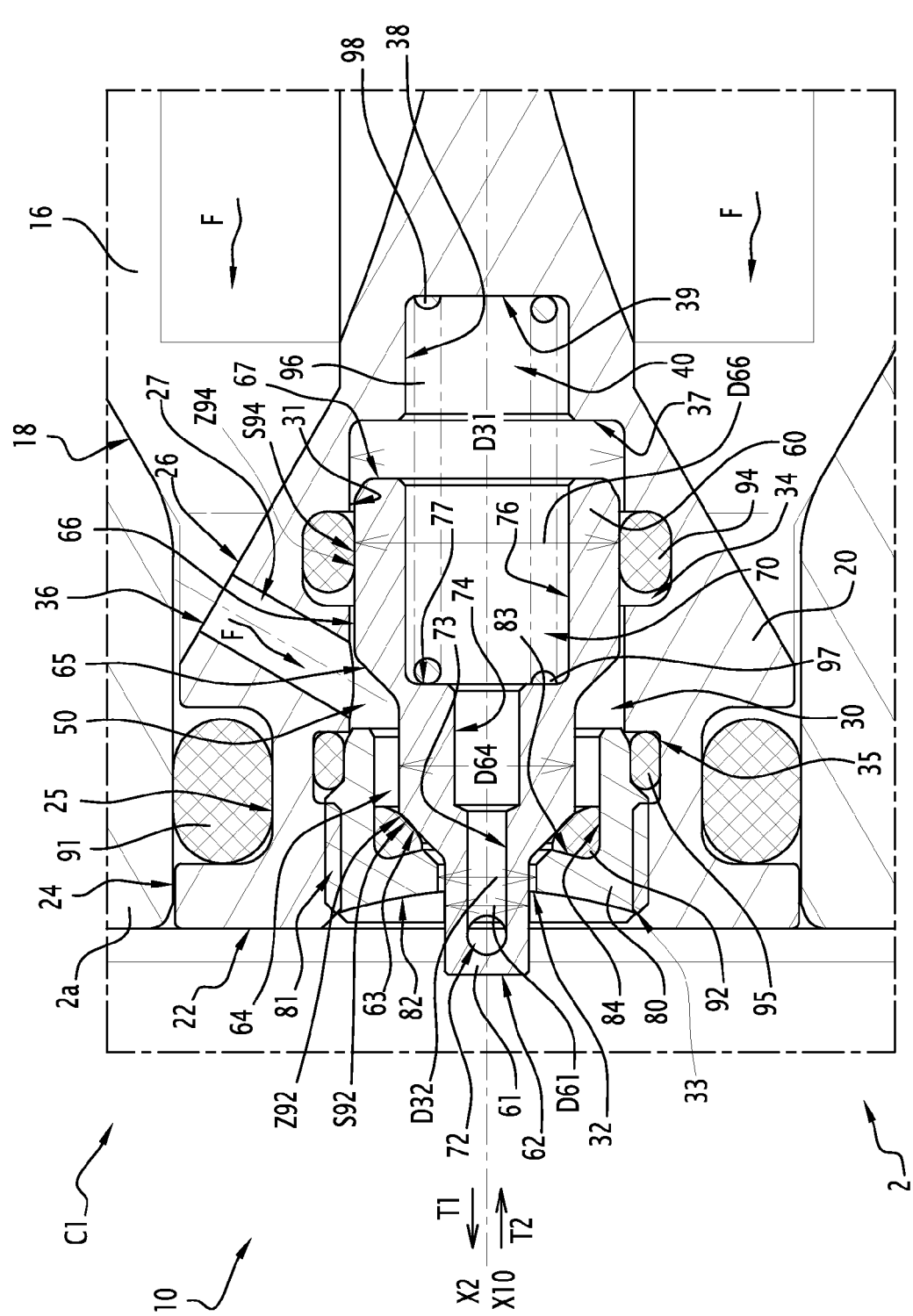
FIG. 2 is a larger-scale view of the detail II in FIG. 1, showing the valve including an obturator in the closed position.

As shown in FIG. 2, the valve device 10 also comprises a body 20, an enclosure 30, a first so-called upper or front chamber 50, a second chamber 40, a so-called lower or rear chamber, an obturator 60 moveable in the enclosure 30 and a cap 80 obturating the enclosure 30 of the front side 4. The valve device 10 also comprises sealing means 91, 92, 94 and 95 as well as elastically deformable means 96. In practice, the sealing means are preferably conformed like annular gaskets.

The valve body 20 is a single block and extends along the central axis X10 of the valve device 10. The body 20 comprises a front face 22 which extends radially to the axis X10 according to an annular profile, an external cylindrical surface 24 centered on the axis X10 and slideably mounted in the body 2*a*, an external annular groove 25 opening out at the surface 24, a rear surface 26 with a substantially frusto-conical shape, as well as a conduit 27 connecting the surface 26 to the enclosure 30 made in the body 20. The tabs 16 are connected to the rear surface 26 of the body 20 and are spaced around the axis X10. Thus, the fluid F may flow between the tabs 16 towards the front 4, as far as the surface 26 and the sealing means 91 which are conformed as an annular gasket.

In practice the gasket 91 is accommodated in the groove 25, between the valve body and the body 2*a* of the endpiece 2. When the valve device 10 is in abutment against the body 2*a*, the gasket 91 ensures the seal between the valve device 10 and the body 2*a*, preventing the passing of fluid F towards the front at the surface 24. When the valve device 10 is moveable in the inner volume V2, this surface 24 is a surface for translational T1 or T2 guidance of the valve body 20 relatively to the body 2*a* along the axis X2, on a portion of the path.

The enclosure 30 comprises a cylindrical internal wall 31 which is centered on the axis X10 and has a diameter D31. The enclosure 30 includes a front orifice 32 opening out on the front side 4 and a rear orifice opening out 36 on the rear side. The orifice 32 has a diameter D32 and is made in the cap 80, which is itself screwed into the tapped portion 33 formed in the body 20 of the front side 4. The diameter of the portion 33 is greater than the diameter D31. In the example of the figures, the diameter D32 is of about one third of the diameter D31. The rear orifice 36 is located at the end of the conduit 27, at the surface 26. The orifice 36 is made behind the surface 24 relatively to the front face 22. The passage section of the orifice 36 is greater than or of the same order in magnitude as the annular section for passage of fluid (D32 minus D61). Thus, the enclosure 30 and the orifices 32 and 36 are suitable for the circulation of the fluid F, while giving the possibility of obtaining a compact valve device 10. Alternatively, the dimensions of the diameters mentioned above may be different from each other without departing from the scope of the invention.

The enclosure 30 also includes an internal annular groove 34 made at the wall 31, as well as an internal annular groove 35 made between the wall 31 and the tapped portion 33. The grooves 34 and 35 receive sealing means 94 and 95 conformed like the annular gaskets. More specifically, the groove 34 receives the gasket 94 achieving the seal between the body 20 and the obturator 60, sealably delimiting the chambers 40 and 50 in the enclosure 30, while the groove 35 receives the gasket 95 achieving the seal between the cap 80 and the body 20 when the cap 80 is screwed into the portion 33.

The enclosure 30 also includes a rear surface 37, which extends radially to the axis X10, has a substantially annular profile and is connected to the wall 31. A cylindrical surface 38 extends from the surface 37 towards the rear and has a diameter of less than the diameter D31. The enclosure 30 includes a rear wall 39 which extends radially to the axis X10, is turned towards the front 4 and is connected to the surface 38. The means 96 for returning the obturator 60, conformed as elastically deformable means such as a spring in the example of the figures, are laid out in the enclosure 30, more specifically in the chamber 40. The spring 96 has a first end 97 bearing forwards against the obturator 60 and a second end 98 bearing against the wall 39. Alternatively, the means 96 may comprise a membrane or any other return element suitable for the present application.

In practice the spring 96 is capable of automatically pushing back the obturator 60 in translation T1 towards the front 4 in a closed position C1 on the one hand and allowing translation T2 of the obturator 60 towards the rear in an open position C2 on the other hand. The closed position C1 is illustrated in FIGS. 1 and 2, while the open position C2 is illustrated in FIGS. 3 to 6.

As shown in FIG. 2, the obturator 60 comprises, from the front 4 to the rear: a cylindrical front portion 61 having a diameter D61 and provided with a planar front face 62, a first frusto-conical surface 63, a first cylindrical surface 64 of diameter D64, a second frusto-conical surface 65, a second cylindrical surface 66 of the diameter D66, as well as a rear annular surface 67. The diameter D66 is greater than the diameter D64 and less than the diameter D31.

Within the scope of the invention, the valve device 10 includes a first seal area Z92 of section S92 located on the side of the front face 22 of the enclosure 30 and a second seal area Z94 of section S94 located opposite to the front face 22 relatively to the first seal area Z92. The area Z92 is defined at the gasket 92, while the area Z94 is defined at the gasket 94. These seal areas Z92 and Z94 have the function of limiting the passing of the fluid between the obturator 60 and the valve body 20, and between the obturator 60 and the cap 80.

In particular, the seal section S92 is delimited between the gasket 92 and the surfaces 63 and 64 of the obturator 60. The section S92 is defined on the frusto-conical profile 63 of the obturator 60 by a maximum diameter D64 and a minimum diameter greater than the diameter D61, as notably shown in FIG. 2. In a possible embodiment, the diameter D66 of seal section S94 is for example of the order of 8 mm while the diameter of the seal section S92 is at most equal to the diameter of D64 of the order of 5.4 mm for guaranteeing a sufficient difference in diameters. The section S94 is defined by the outer diameter D66 of the surface 66 of the obturator 60. This surface 66 is sealably in contact with the gasket 94 at the seal section S94, regardless of the position of the obturator 60 in the enclosure 30, the diameter D61 is less than the diameter D32.

When the obturator 60 is in the closed position C1, the front portion 61 juts out through the orifice 32 beyond the front supporting face 22. When the obturator 60 is in an open position C2, the front portion 61 partly retracts into the enclosure 30. The chambers 40 and 50 have variable volumes depending on the position of the obturator 60 in the enclosure 30.

The obturator 60 also comprises an internal cavity 70 which extends along the axis X10. The cavity 70 opens out towards the rear at the surface 67 and towards the front at two radial channels 72, made in the portion 61 on either side of the axis X10, radially to this axis X10. The cavity 70 comprises an inner cylindrical surface 73 which extends towards the rear from the channel 72, and then an inner cylindrical surface 74 of larger diameter than that of the surface 73, and then an inner cylindrical surface 76 of larger diameter than the surface 74. The cavity 70 also includes an annular surface 77 which extends radially to the axis X10, is turned towards the rear and is connected to the surface 76. The end 98 of the spring 96 rests against this surface 77, positioned facing the wall 39.

The cap 80 comprises a threaded external surface 81, a rearward convex front face 82, a convex rear surface 83 and an inner cylindrical surface 84. The threaded surface 81 is adapted so as to cooperate with the tapped portion 33 of the body 20, so that the cap 80 may be screwed into the enclosure 30. The front orifice 32 of the enclosure 30 is made through the cap 80, between the face 82 and the surface 83 along the axis X10. The surfaces 83 and 84 are connected to each other in the chamber 50, rearwards, forming an angle of less than 90° sectionally in a plane including the axis X10. The sealing means 92 which are conformed like an annular gasket are positioned in this angle formed between the surfaces 83 and 84.

In practice, the gasket 92 is secured to the cap 80 to which it may be attached by adhesion, for example by adhesive bonding or by overmolding. In the closed position C1 of the obturator 60 fitting out the valve device 10, the frusto-conical external surface 63 of the obturator 60 is maintained in leakproof contact against the gasket 92, thus preventing the passing of fluid F from the chamber 50 towards the front orifice 32. Upon passing from the closed position C1 to the open position C2, the obturator 60 and in particular its surface 63 move away from the gasket 92, thereby allowing passage of fluid F from the chamber 50 to the orifice 32. As the surface 63 is conical, the loss of the seal is instantaneous when the obturator 60 moves away from the gasket 92, independently of the travel of the obturator 60 in the translational direction T2. In other words, the contact or the absence of contact between the mobile obturator 60 and the fixed gasket 92 allows limitation or allows opening or closing of the circulation circuit of fluid F in the valve device 10, at the chamber 50.

The chamber 40 includes the spring 96 and is delimited by the enclosure 30, the obturator 60, the cavity 70 and the gasket 94 on the rear side of this gasket 94. The chamber 40 opens out from the valve body 20 at the channel 72, at the front end of the cavity 70. Under these conditions, the cavity 70 and the channel 72, when the obturator 60 fitting out the valve device 10 is in a closed position C1, are suitable for maintaining the chamber 40 at an external pressure below the pressure of the fluid F penetrating into the chamber 50, notably for maintaining the chamber 40 at ambient pressure. Advantageously, the channel 72 gives the possibility of opposing the distinct pressures of both chambers 40 and 50 in order to generate the pressure difference upon balancing, with a view to automatic discharge.

The chamber 50 includes the gasket 92 and is delimited by the enclosure 30, the obturator 60, the cap 80, the gasket 92 and the gasket 94, on the front side of this gasket 94. The chamber 50 permanently opens out from the valve body 20 at the rear orifice 36. In the closed position C1, the chamber 50 is obturated by the contact of the obturator 60 on the gasket 92, under the action of the spring 96. The chamber 50 is then at the pressure of the fluid F in the circuit, i.e. in the inner volume V2. In the open position C2, the obturator 60 is moved away from the gasket 92 while opposing the action of the spring 96 and the chamber 50 communicates with the front orifice 32.

Within the scope of the present invention, there exist two ways for passing from the closed position C1 to the open position C2 of the obturator 60 and therefore of the circuit of fluid F, by translation T2 of the obturator 60 rearwards: either automatically under the action of over pressure of the fluid F, penetrating through the rear orifice 36 into the chamber 50, the fluid F then exerting pressure on the frusto-conical surface 65 of the obturator 60 so as to exert an axial pressure on the obturator 60, opposed and greater than the pressure of the spring 96 maintaining the obturator 60 in the closed position C1, or voluntarily by pressing on the front portion 61 of the obturator 60 at the front face 22 of the valve 10. In both cases, the obturator 60 is driven rearwards in the same direction T2. While advantageously combining both functions, this gives the possibility of simplifying the construction of the valve device 10. For lack of one of the two conditions described above, the obturator 60 is brought back translationally T1 towards the front 4 against the gasket 92 under the action of the spring 96.

Figure 3:
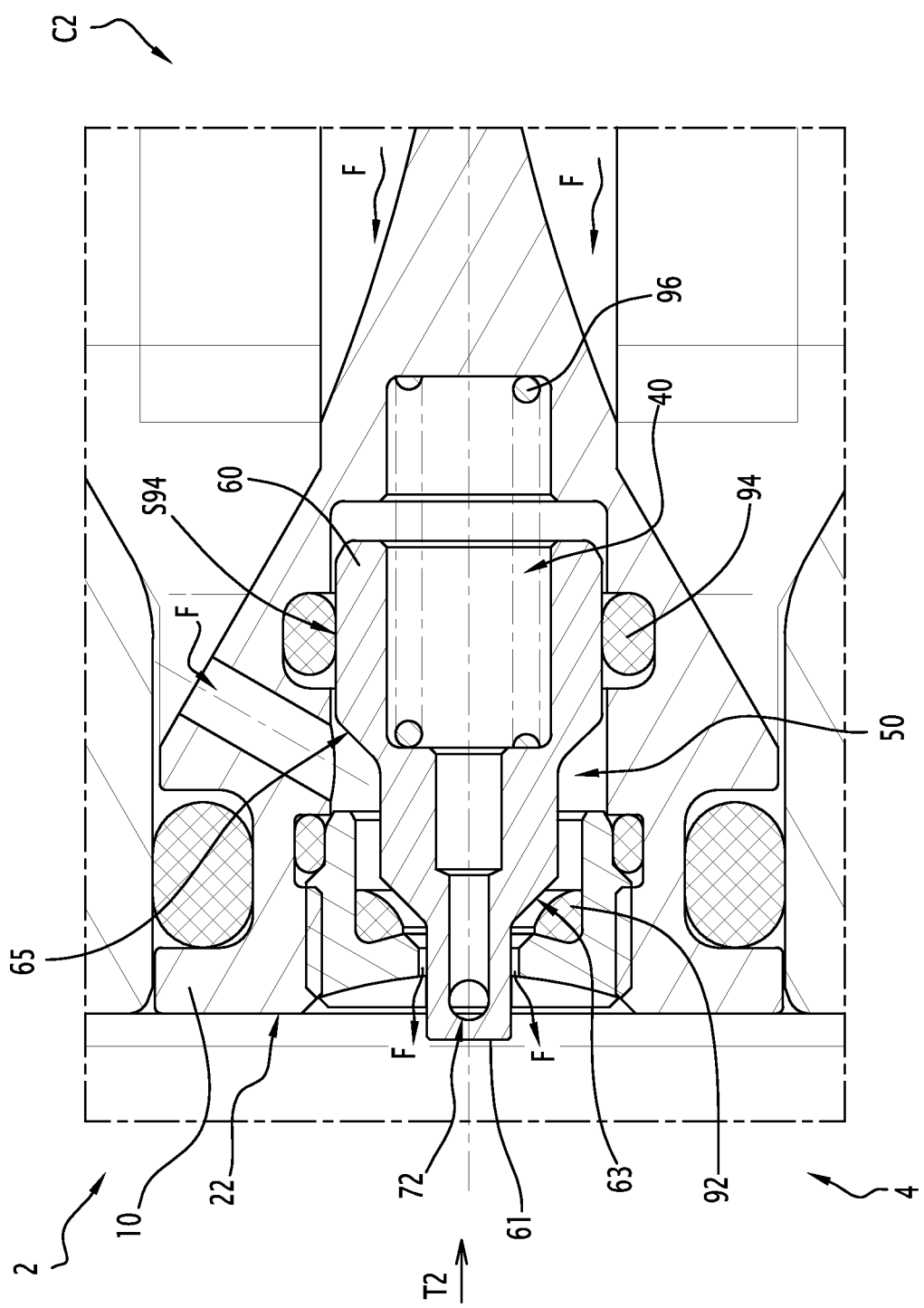
FIG. 3 is a view similar to FIG. 2, showing the valve with the obturator in the open position because of overpressure in the female endpiece fluid circuit.

In FIGS. 1 and 2, the connector 1 is in uncoupled configuration. In the inner volume V2, the pressure of the circuit of fluid F and/or the action of the spring 2F maintains the valve device 10 in an advanced position against the body 2*a*, while the spring 96 maintains the obturator 60 in the advanced position against the gasket 92. The circuit of fluid F is therefore closed. When the connector 1 is an uncoupled configuration, overpressure may occur in the circuit of fluid F, in the inner volume V2 and therefore in the chamber 50. The fluid F is compressed in the chamber 50 and exerts pressure rearwards on the frusto-conical surface 65 of the obturator 60. Beyond a predetermined overpressure, also called a discharge pressure, the force exerted by the pressurized fluid F exceeds the return force of the spring 96 and causes the obturator 60 to move backwards in the direction of translation T2, as shown in FIG. 3. This backward movement causes the opening C2 of the circuit, while cancelling the seal at the area Z92 of section S92, thereby allowing controlled discharge of the fluid F through the front orifice 32. When the pressure of the fluid F decreases below the discharge pressure threshold, the obturator 60 comes back to the advanced position C1 for closing the valve device 10 and the circuit, under the action of the spring 96, automatically. The seal is then again found at the area Z92 of section S92.

Upon calibration of the purging and discharge device, it is possible to determine the conditions for moving back the obturator 60 by suitable selections of a difference in diameters of the seal sections S92 and S94 and in the characteristics of the obturator spring 96, by determining the pressure thresholds beyond which voluntary pressure of the operator or internal overpressure will respectively give the possibility of purging or discharging the circuit. Notably depending on the ratio of the sections S92 and S94, the obturator surface area is defined, on which the pressure is exerted in the case of overpressure of fluid F2 in the duct. The mechanical characteristics of the elastic means 96 coupled with the difference in sections S92 and S94 give the possibility of knowing the pressure threshold beyond which the device acts with a discharge function. The forces exerted by the elastic means 96 give the possibility of determining the forces which have to be applied on the obturator 60 so that the device 10 fulfils its purging function.

Figure 4:
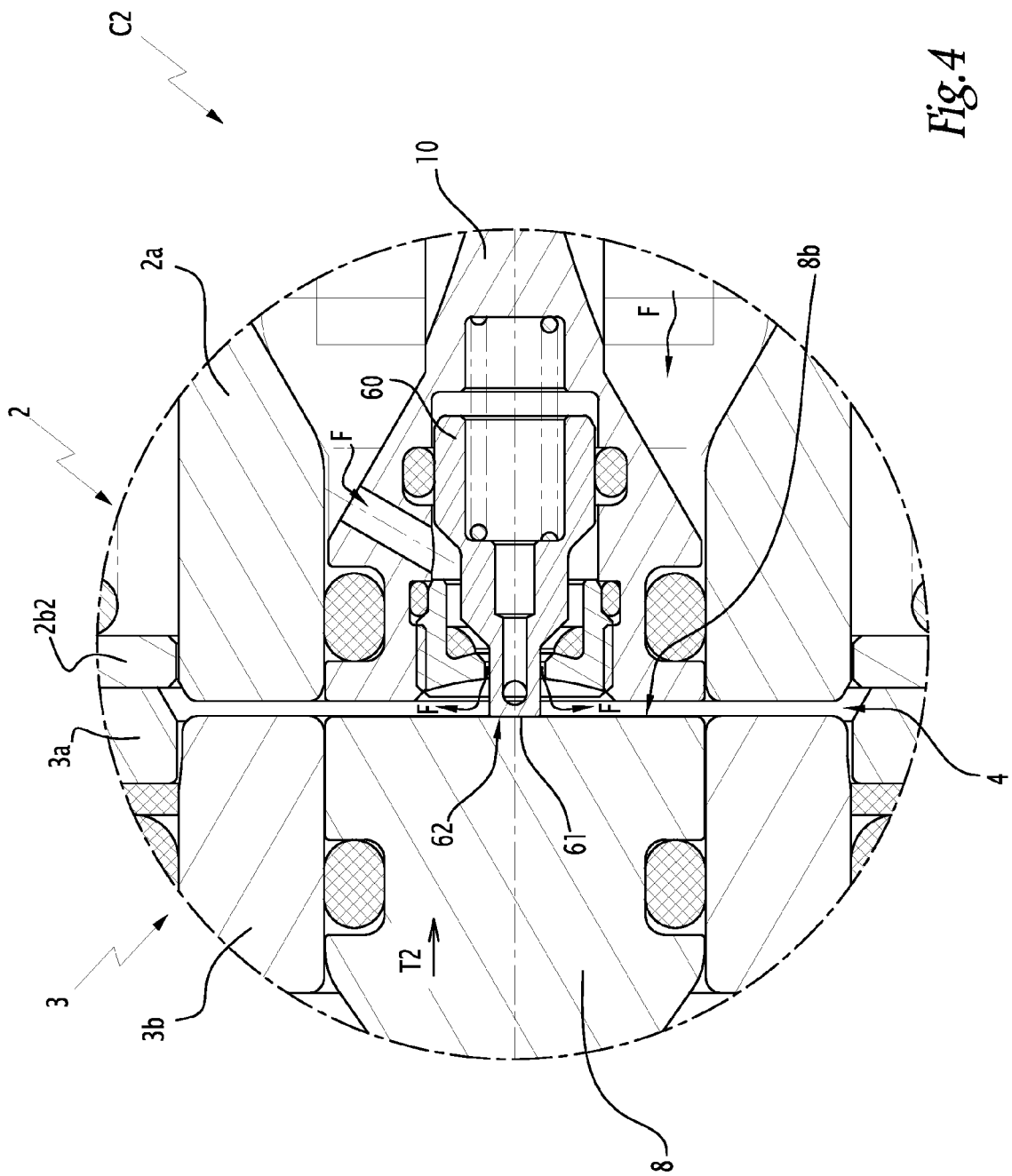
FIG. 4 is a view similar to FIGS. 2 and 3, at a slightly smaller scale, showing the connector being coupled with the obturator in the open position because of the pressing action of a piston fitting out the male endpiece on a front portion of the mobile obturator in the valve.

In FIG. 4, the connector 1 is being coupled. The operator takes the male connecting endpiece 3 mating the female connecting endpiece 2 and will flatten this male endpiece 3 against the female endpiece 2. The planar face 8b of the piston 8 will then bear upon the front portion 61 of the obturator 60, which emerges at the front face 22 of the valve device 10, in order to move the obturator 60 back into the direction of translation T2. The operator acts by opposing the force of the spring 96 and forces backward movement of the obturator 60, which causes a release of the residual pressure of the fluid F into the female connecting endpiece 2 and purges the circuit. When the purge begins, play between the faces 8b and 22 allow flow of the fluid F to escape out of the connector 1. Preferably, the faces 22 and 8b are lined or grooved for promoting this flow.

At this stage, it is noted that the profile of the external wall of the obturator 60, comprising the surfaces 63, 64, 65 and 66, determines the volume of the chamber 50 in the closed position C1, and therefore the threshold overpressure value of the fluid F translating the obturator 60 from the closed position C1 to the open position C2 towards the valve device 10. Indeed, it is against this external wall that the pressure of the fluid is exerted allowing backward movement of the obturator 60 in the case of overpressure in the inner volume V2 of the endpiece 2.

Passing from FIG. 4 to FIG. 5, the coupling of the connector 1 is continued. The circuit is purged, the obturator 60 is maintained in the rear and the valve device 10 is maintained in the open position C2. The operator maintains and even increases his/her axial coupling force, so that the female endpiece 2 pushes back the drawer 3b of the male endpiece 3 and successively opens the circuits of the two connecting endpieces. The body 3a of the male endpiece 3 pushes back the ring 2b2 of the female endpiece 2, while the body 2a penetrates the tubular space delimited in the body 3a, while opposing the action of the springs 2f and 3f.

In FIGS. 5 and 6, the connector 1 is in a coupled configuration and both fluid veins are connected, allowing circulation of the fluid F from the endpiece 2 to the endpiece 3. The mechanism 2b locks the endpiece 2 on the endpiece 3, with the balls 2b1 which penetrate and are maintained in the groove 3c. The gaskets 8g and 91 are no longer maintained against their sealing surfaces and again assume their shape at rest in their respective grooves 8c and 25. The springs 2f and 3f are compressed.

During the maneuver for uncoupling both endpieces 2 and 3 of the connector 1, the mechanism 2b is unlocked and the springs 2f and 3f push back the different connecting elements into their initial position. The gaskets 91 and 8g return so as to be accommodated in their respective endpieces 2 and 3. The obturator 60 then again assumes its initial position under the action of its return spring 96. The seal of the circuits at a maximum discharge pressure is again found.

Thus, the valve device 10 according to the invention forms a compact and automatic limiter-purger proposing the dual function of discharge and purging by the sliding in the body 20 of a single obturator 60 in a same direction T2: this having the advantage of only requiring a single closing of the circuit for fulfilling both of these functions, in an economical and reliable way.

Other embodiments of the invention are described hereafter. Certain constitutive elements of these embodiments are comparable with those of the first embodiment and, for the purpose of simplification, bear the same numerical references. Other constitutive elements have comparable operation, but a different structure, from those of the first embodiment and bear the same numerical references respectively increased by 100, 200, 300 or 400 depending on the embodiment.

Figure 7:
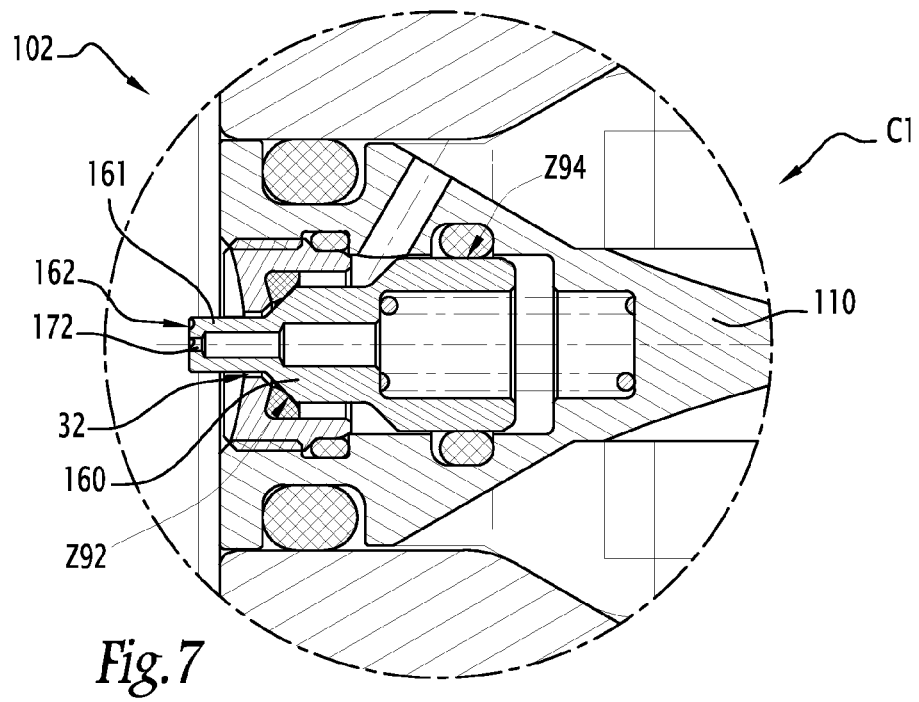
FIG. 7 is a view similar to FIG. 2 at a smaller scale, of a second embodiment of a second connecting endpiece and of a valve according to the invention.

In FIG. 7, is illustrated a second embodiment of a female connecting endpiece 102 and of a valve device 110 according to the invention.

The main difference with the first embodiment is that the front cylindrical portion 161 of the obturator 160 includes an axial channel 172 opening out along the axis X10 at the front face 162.

Figure 8:
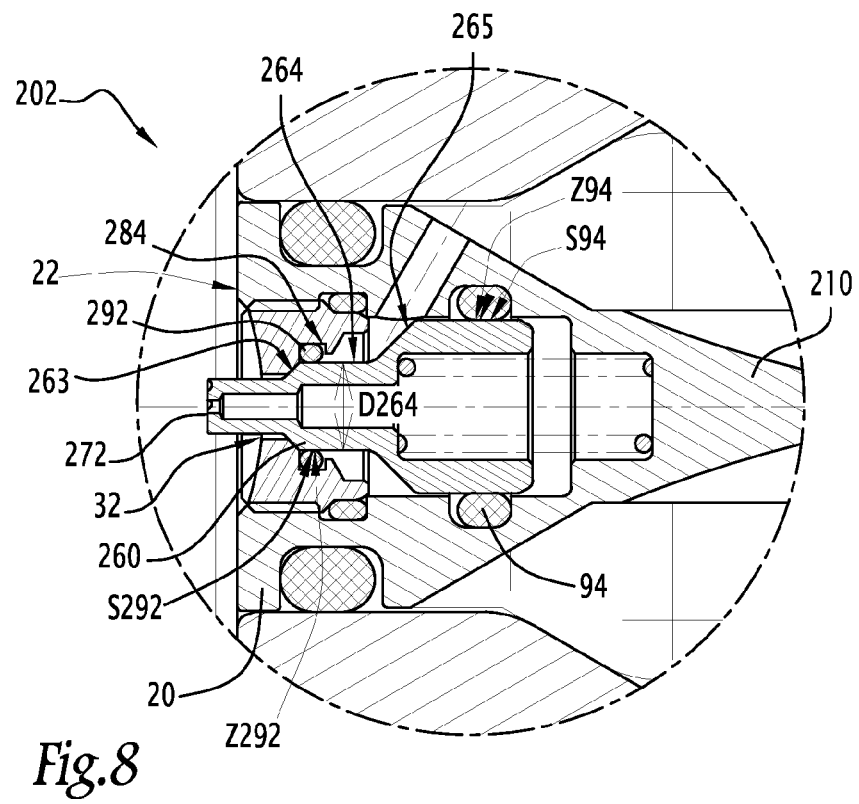
FIG. 8 is a similar view to FIG. 7 of a third embodiment of a connecting endpiece and of a valve according to the invention.

In FIG. 8, is illustrated a third embodiment of a female connecting endpiece 202 and of a valve device 210 according to the invention.

The main differences with the first embodiment relate to the obturator 260 and to the gasket 292. As regards its arrangement in the valve device 210, the gasket 292 is positioned in a radial groove 284 centered on the central axis X10 and secured to the cap 280, itself screwed into the body 20 at the front face 22. The obturator 260 includes a frusto-conical surface 263 which is of less extent that the surface 63 and a frusto-conical surface 265 which is of greater extent than the surface 65, so that the surface 264 has a diameter below that of the surface 64. When the obturator 260 is in the closed position C1, the surface 264 is positioned in abutment against the cap 280 and is maintained in a leak-proof contact radially to the central axis X10 inside the gasket 292, at the seal section S292. Thus, the determination of the seal conditions between the obturator 260 and the gasket 292 is more accurate, but the inertia of the system increases because of the additional travel required for moving back the obturator 260 and thus having the obturator 260 pass from the closed position C1 to the open position C2.

Further, it is noted that the valve device 210 comprises an axial channel 272 identical with the channel 172.

In FIG. 9 is illustrated a fourth embodiment of a connector 301, of a male connecting endpiece 303 and of a purging and discharge device 308 according to the invention.

The main difference with the first embodiment is that the purging and discharge device 308 is of the valve actuation piston type positioned in the male connecting endpiece 303 and not of the valve type positioned in the female connecting endpiece 302 of the connector 301.

More specifically, the device 308 is integrated into the head of the piston fitting out the endpiece 303, at the front end 4 of the rod 8d. The device 308 comprises i.a. an enclosure 30, a front orifice 32, a rear conduit 27, a rear orifice 36, chambers 40 and 50, an obturator 60, a front cylindrical portion 61, a cap 80, gaskets 92 and 94, as well as a spring 96. Except for the differences in construction, the piston device 308 ensures both the limiter and purger functions, in a comparable way with the valve device 10.

For its part, the valve 310 fitting out the female endpiece 2 comprises a supporting front face 322' on the portion 61 of the piston 308 during the coupling of the connector 301.

In FIG. 10 is illustrated a fifth embodiment of a connector 401 according to the invention.

In this embodiment, the female endpiece 402 and the male endpiece 403 are each equipped with a device, respectively 410, 408, according to the invention. The device of the valve type 410 is similar to the device 10, while the device of the piston type 408 is similar to the device 308, as described above. Separately, each device 410 or 408 is adapted in order to ensure a limiter function. When the connector 401 is coupled, the cylindrical portions which extend through the front orifice of each of the devices 410 or 408 are mutually pushed back thereby ensuring the purging function.

Regardless of the embodiment, the discharge and purging device 10, 110, 210, 308, 408 or 410 comprises a valve or a valve actuation piston.

Also, regardless of the embodiment, the chamber 50 is defined in the enclosure 30, when the obturator 60, 160, 260 or 360 is in its closed position C1, between walls 31 and 84 of the enclosure 30, walls of the cap 80, the obturator, the first seal area Z92 or Z292 of section S92 or S292 located on the front of the enclosure and the second seal area Z94 of section S94 located on the rear of the enclosure. In every case, the first seal section S92 or S292 is smaller than the second seal section S94. In practice, the seal section S92 is delimited between the gasket 92 and at least one surface of the obturator. These seal surfaces defined on the obturator are either the surfaces 63 and 64, or the surface 264 in the examples of the figures. In the first case, the section S92 is defined by a maximum diameter D64 and a minimum diameter greater than the diameter D61, as notably shown in FIG. 2. In the second case, the section S292 is defined by the diameter D264, as shown in FIG. 8. Alternatively, the seal section S92 or S292 may be defined differently without departing from the scope of the invention.

Moreover, the discharge and purging device, the connecting endpiece and/or the connector may be configured differently from the figures without departing from the scope of the invention. The following alternatives are described with reference to the connector 1 and to the device 10, it being understood that they also apply to the other embodiments.

In an alternative not shown, the device 10 may be integrated to any connector 1 provided for a particular application, in which automatic discharge and voluntary purging means are advantageous.

For example, the invention may be applied within the scope of the supply of hydraulic circuits for controlling the position of rolling mill rollers. In this industrial application, hydraulic pistons may control the vertical position of a set of rolling mill rollers. Two parallel problems of purging and of limiting the rise in pressure may then occur, when the pressure exerted by the weight of the rolling mills compresses the pistons and the fluid, and therefore pressurizes the distribution valves making it difficult or even impossible to connect the circuit to a purging circuit, on the one hand and when an abnormal rise in pressure of the circuit, often due to a remarkable temperature rise, is not under control and risks causing damage to the installation on the other hand.

According to another alternative not shown, the body 20 of the device 10 is not a single block. In this case, the cap 80 may optionally be mounted through the rear and not through the front.

According to another alternative not shown, the body 20 may include several rear orifices 36 distributed around the axis X10.

According to another alternative not shown, the obturator 60 comprises at least one radial or axial channel 72, giving the possibility of maintaining or bringing back the chamber 40 to ambient pressure.

According to another alternative not shown, the sealing means fitting out the connector 1, and notably the gaskets 91, 92, 94, 95 may be conformed or arranged in a different way without departing from the scope of the invention.

Additionally, the technical features of the different embodiments may in totality or for some of them, be combined together. Thus, the discharge and purging device, the connecting endpiece and/or the connector may be adapted in terms of costs, functionality and performance.

The invention claimed is:

1. A discharge and purging device, adapted for limiting a pressure of a fluid occupying an inner volume of a connecting endpiece connected to a duct and allowing lowering of a residual pressure of the fluid upon coupling, the device comprising:
    a valve or a valve actuation piston,
    an inner enclosure opening out on a front face of the valve or of the valve actuation piston, the front face cooperating with a valve actuation piston or a valve of an additional connecting endpiece, and
    an obturator moveable in translation in the enclosure along a central axis between:
        a closed position where the obturator obturates the front face of the enclosure at a first seal area defining a first seal section located on the side of the front face and
        an open position where the obturator no longer obturates the front face, wherein the device also comprises:
    a first chamber defined when the obturator is in its closed position, between walls of the enclosure, the obturator, the first seal area and a second seal area defining a second seal section located opposite the front face relative to the first seal area,
    a communication passage between the first chamber and the inner volume of the connecting endpiece,
    means for returning the obturator to its closed position, and
    a second chamber defined between walls of the enclosure, the second seal area and the obturator the second chamber being isolated from the inner volume of the connecting endpiece and from the first chamber, and wherein the first seal section is smaller than the second seal section.

2. The discharge and purging device according to claim 1, wherein the obturator comprises at least one channel opening out from a front portion of the obturator and extending through the obturator between the second chamber and an outside of the obturator.

3. The discharge and purging device according to claim 2, wherein the obturator includes two channels opening out from the front portion of the obturator radially to the central axis and extending between the second chamber and the outside of the obturator.

4. The discharge and purging device according to claim 1, wherein the first seal area includes sealing means which are fixed relative to the valve or to the valve actuation piston when the obturator is moveable in the enclosure.

5. The discharge and purging device according to claim 4, wherein a frusto-conical external surface of the obturator is maintained in leak-proof contact against the sealing means in the closed position of the obturator.

6. The discharge and purging device according to claim 4, wherein the sealing means are fixed by adhesion to the valve or valve actuation piston.

7. The discharge and purging device according to claim 4, wherein a cylindrical external surface of the obturator is maintained in leak-proof contact radially to the central axis against the sealing means in the closed position of the obturator.

8. The discharge and purging device according to claim 7, wherein the sealing means are positioned in a radial groove centered on the central axis.

9. The discharge and purging device according to claim 7, wherein the sealing means comprise an O-ring gasket.

10. The discharge and purging device according to claim 1, further including a cap screwed into a tapped portion of the enclosure at the front face.

11. The discharge and purging device according to claim 10, wherein the first seal area includes sealing means secured to the cap.

12. The discharge and purging device according to claim 1, wherein the means for returning the obturator which is positioned in the second chamber includes a single spring having a first end bearing against the obturator and a second end bearing against a wall of the enclosure.

13. A connecting endpiece adapted for the circulation of pressurized fluids, the connecting endpiece being configured as a male or female endpiece and adapted for coupling with another additional connecting endpiece either male or female, wherein the connecting endpiece, is equipped with a discharge and purging device according to claim 1.

14. A connector adapted for circulation of pressurized fluids, comprising a female connecting endpiece connected to a first duct and a male connecting endpiece connected to a second duct, wherein at least one connecting endpiece from the female connecting endpiece and from the male connecting endpiece is equipped with a discharge and purging device according to claim 1.

* * * * *